United States Patent
Jonsson

(10) Patent No.: US 9,628,588 B2
(45) Date of Patent: Apr. 18, 2017

(54) PACKET DATA UNIT, A RECEIVING COMMUNICATION DEVICE, A RADIO NETWORK CONTROLLER AND METHODS THEREIN FOR TRANSMITTING DATA FROM THE RADIO NETWORK CONTROLLER TO THE USER EQUIPMENT

(75) Inventor: Anders Jonsson, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 892 days.

(21) Appl. No.: 13/509,204

(22) PCT Filed: Apr. 11, 2012

(86) PCT No.: PCT/SE2012/050388
§ 371 (c)(1),
(2), (4) Date: May 10, 2012

(87) PCT Pub. No.: WO2012/141648
PCT Pub. Date: Oct. 18, 2012

(65) Prior Publication Data
US 2012/0281651 A1 Nov. 8, 2012

Related U.S. Application Data

(60) Provisional application No. 61/474,513, filed on Apr. 12, 2011.

(51) Int. Cl.
*H04W 28/06* (2009.01)
*H04L 29/06* (2006.01)
*H04W 80/02* (2009.01)

(52) U.S. Cl.
CPC ............ *H04L 69/22* (2013.01); *H04W 80/02* (2013.01)

(58) Field of Classification Search
CPC ... H04W 4/18; H04W 28/12; H04W 28/0273; H04W 36/0083; H04W 88/04;
(Continued)

(56) References Cited

U.S. PATENT DOCUMENTS 4,617,657 A * 10/1986 Drynan et al. ............... 370/394
5,151,899 A *  9/1992 Thomas et al. ............... 370/394
(Continued)

FOREIGN PATENT DOCUMENTS

| EP | 1936908 A1 | 12/2006 |
|---|---|---|
| EP | 2007104 A1 | 6/2007 |
| EP | 2023547 A1 | 8/2007 |
| KZ | 20453 A | 12/2008 |
| WO | 0128180 A2 | 4/2001 |
| WO | 03047189 A | 6/2003 |
| WO | 2010049312 A1 | 5/2010 |

OTHER PUBLICATIONS

3GPP, "3rd Generation Partnership Project; Technical Specification Group Radio Access Network; Radio Link Control (RLC) protocol specification (Release 10)", 3GPP TS 25.322 V10.0.0, Dec. 2010, 1-88.

(Continued)

*Primary Examiner* — Mohamed Kamara
(74) *Attorney, Agent, or Firm* — Murphy, Bilak & Homiller, PLLC

(57) ABSTRACT

Some embodiments herein relate to a method in a radio network controller (14) for transmitting data to a user equipment (18) in a wireless communication system (10). The radio network controller (14) is communicating over a Radio Link Control layer with the user equipment (18). The radio network controller transmits a packet data unit to the user equipment (18). The packet data unit comprises a header with a first field, which first field comprises bits for a sequence number of the packet data unit. The header further comprises a second field comprising at least one bit indicating that a third field of the header comprises bits for the sequence number as an extension of bits to the first field for the sequence number.

26 Claims, 8 Drawing Sheets

(58) Field of Classification Search
CPC .... H04W 56/001; H04L 1/0006; H04L 1/003; H04L 1/1642; H04L 12/08; H04L 12/40071
USPC ....... 370/252, 310, 328–331, 338, 341, 394, 370/395.1, 466–472, 474–476; 455/436, 455/411
See application file for complete search history.

(56) References Cited

U.S. PATENT DOCUMENTS

| | | |
|---|---|---|
| 7,701,893 B2 | 4/2010 | Zucca et al. |
| 8,027,359 B2 * | 9/2011 | Iwamura ................. 370/465 |
| 2004/0057423 A1 * | 3/2004 | Beckmann et al. ......... 370/352 |
| 2007/0072612 A1 * | 3/2007 | Haraguchi et al. .......... 455/436 |
| 2008/0161026 A1 | 7/2008 | Wiatrowski et al. |
| 2009/0061820 A1 * | 3/2009 | Patel et al. ................. 455/411 |
| 2009/0207786 A1 | 8/2009 | Yi et al. |

OTHER PUBLICATIONS

Unknown, Author, "RLC impact analysis for 8C-HSDPA", 3GPP TSG RAN WG2 Meeting #73bis, R2-112083, Huawei, HiSilicon, Shanghai, China, Apr. 11-15, 2011, 1-5.

* cited by examiner

PACKET DATA UNIT, A RECEIVING COMMUNICATION DEVICE, A RADIO NETWORK CONTROLLER AND METHODS THEREIN FOR TRANSMITTING DATA FROM THE RADIO NETWORK CONTROLLER TO THE USER EQUIPMENT

TECHNICAL FIELD

Embodiments herein relate to a user equipment, a radio network node and methods therein. In particular, the embodiments herein relate to transmit data from the radio network controller to the user equipment. Furthermore, a packet data unit is disclosed herein.

BACKGROUND

In today's wireless communication systems a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A wireless communication system comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions. The radio base stations may be controlled by one or more Radio Network Controllers (RNC).

The 3$^{rd}$ Generation Partnership Project (3GPP) has introduced a number of enhancements to High-Speed Downlink Packet Access (HSDPA) over the course of several releases. In particular, in the period from Release 8 (or Rel-8, for short) to Rel-10, 3GPP introduced support for multi-cell downlink transmissions.

In this regard, 3GPP standardized Rel-8 to include Dual-Cell HSDPA (DC-HSDPA) operation, whereby the network may schedule simultaneous transmissions on two adjacent downlink carriers to user equipment (UE). In Rel-9, 3GPP introduced support for DC-HSDPA in combination with Multiple-Input Multiple-Output (MIMO) transmissions, as well as Dual-Band DC-HSDPA. MIMO is used to improve performance by the use of multiple antennas at both the transmitter and receiver. The former provided a peak data rate of 84 Mbps while the later extended the Rel-8 DC-HSDPA feature so that the two configured downlink carriers may be located in different frequency bands. In Rel-10, 3GPP introduced 4 Carrier HSDPA (4C-HSDPA) operation which provides peak downlink data rates of 168 Mbps. In 4C-HSDPA four configured downlink carriers may be spread across at most two frequency bands. All configured downlink carriers within a frequency band need to be adjacent in 4C-HSDPA operation.

At this time, 3GPP is specifying support for Eight Carriers (8C)-HSDPA in Rel-11. This will allow peak data rates up to 336 Mbps. As in Rel-10, the eight downlink carriers can be spread across two frequency bands and all configured carriers within a band need to be adjacent. This concerns downlink but the problem of supporting high bit rates may as well relate to uplink.

Control signaling between the radio base stations or other nodes such as RNCs may be performed over Radio Link Controlling signalling. Radio Link Control (RLC) is a protocol used in mobile communication networks to reduce the error rate over wireless channels. Through the use of forward error correction and retransmission protocols, a physical layer, comprising the transmission technology, may typically deliver packets with an error rate on the order of 1%. The Transport Control Protocol (TCP) used in most IP networks, however, requires an error rate in the order of 0.01% for reliable communications. The RLC protocol bridges the gap between the error performance of the physical layer and the requirements for reliable communication over TCP networks.

The RLC protocol is responsible for the error free, in-sequence delivery of IP packets over the wireless communication channel. RLC divides IP packets, also called RLC service data units (SDUs), into smaller units called RLC protocol data units (PDUs) for transmission over the wireless communication channel. A retransmission protocol is used to ensure delivery of each RLC PDU. If an RLC PDU is missed at the receiver, the receiver can request retransmission of the missing RLC PDU. The RLC SDU is reassembled from the received RLC PDUs at the receiver.

The RLC protocol provides a reliable radio link between the network, such as the RNC, and the user equipment. RLC Acknowledged Mode (AM) provides high reliability by providing selective retransmissions of RLC PDUs that have not been correctly received by a user equipment. The RLC PDUs are sent to the user equipment in sequence and are correspondingly numbered with an RLC Sequence Number (SN). The user equipment sends a positive or negative acknowledgement for each RLC SN, to confirm whether or not the user equipment correctly received an RLC PDU with that SN. The network retransmits those RLC SNs that are negatively acknowledged.

Because the RLC SDU's can be large, in this case exemplified by IP packets, RLC provides a mechanism for segmentation and concatenation of IP packets. Segmentation allows IP packets to be divided into multiple RLC PDUs for transmission. Concatenation enables parts of multiple IP packets to be included in a single RLC PDU. The header of the RLC PDU conventionally includes a length indicator (LI) to indicate the length of bits of each IP packet to enable reassembly of the IP packets at the receiver. Whether the Length indicator is present in the PDU is indicted by a header extension field in the header.

The RLC block is the basic transport unit on the air interface that is used between the user equipment and the network, such as the RNC via the radio base station, and is used to carry data and RLC signaling. The RLC layer processes data for High Speed Data Packet Access (HSDPA) connections e.g. in the Acknowledge Mode (AM) e.g. for non-real time services and in an Unacknowledged mode (UM) e.g. for real time services. Currently, the downlink RLC throughput is limited and cannot support the data rates associated with e.g. 8C-HSDPA or 4C-HSDPA with MIMO.

SUMMARY

An object of embodiments herein is to provide a mechanism to support higher throughput in a wireless communication system.

According to an aspect the object may be achieved by a method in a radio network controller for transmitting data to a user equipment in a wireless communication system. The radio network controller is communicating over a Radio Link Control layer with the user equipment. The radio network controller transmits a packet data unit to the user equipment. The packet data unit comprises a header with a first field. The first field comprises bits for a sequence number of the packet data unit. The header further comprises a second field comprising at least one bit. The at least one bit indicates that a third field of the header comprises bits for the sequence number as an extension of bits to the first field for the sequence number.

According to an aspect the object may be achieved by a method in a user equipment for receiving data from the radio network controller in the wireless communication system. The user equipment is communicating over the Radio Link Control layer with the radio network controller. The user equipment recognizes that a packet data unit received from the radio network controller comprises a header with bits indicating a sequence number in a first field and in a third field based on at least one bit in a second field of the header. The at least one bit indicates that the third field of the header comprises bits for the sequence number as an extension of bits to the first field for the sequence number.

According to yet another aspect the object is achieved by a radio network controller for transmitting data to a user equipment in a wireless communication system. The radio network controller is configured to communicate over a Radio Link Control layer with the user equipment. The radio network controller comprises a transmitting circuit configured to transmit a packet data unit to the user equipment. The packet data unit comprises a header with a first field, which first field comprises bits for a sequence number of the packet data unit. The header further comprises a second field comprising at least one bit indicating that a third field of the header comprises bits for the sequence number as an extension of bits to the first field for the sequence number.

According to still another aspect the object is achieved by a user equipment for receiving data from a radio network controller in a wireless communication system. The user equipment is configured to communicate over a Radio Link Control layer with the radio network controller. The user equipment comprises a recognizing circuit configured to recognize that a packet data unit received from the radio network controller comprises a header with bits indicating a sequence number in a first field and in a third field based on at least one bit in a second field of the header. The at least one bit indicates that the third field of the header comprises bits for the sequence number as an extension of bits to the first field for the sequence number.

According to some embodiments herein the aspect may be achieved by a packet data unit for transmitting data between a radio network controller and a user equipment. The data packet unit comprises a header with a first field, which first field comprises bits for a sequence number of the packet data unit. The header further comprises a second field comprising at least one bit indicating that a third field of the header comprises bits for the sequence number as an extension of bits to the first field for the sequence number.

Embodiments herein enable an extension of bits for the sequence number to support higher bit rates e.g. 336 Mpbs. In that the packet data units are limited in size the feature that the sequence number is extended enable more packets with higher sequence number to be transmitted. Thereby, embodiments herein avoid that the downlink RLC throughput is limited and support data rates associated with 8C-HSDPA or 4C-HSDPA with MIMO.

BRIEF DESCRIPTION OF THE DRAWINGS

Embodiments will now be described in more detail in relation to the enclosed drawings, in which.

DETAILED DESCRIPTION

Currently, the downlink RLC throughput is limited and cannot support the data rates associated with 8C-HSDPA or 4C-HSDPA with MIMO as stated above. The downlink RLC throughput is limited by the RLC SN space. With an RLC SN space of 12 bits and a maximum RLC PDU size of 1504 octets, the RLC layer throughput will be limited by the RLC layer due to so-called RLC window stall. An RLC window stall is characterized by an intermittent transmission of data from the transmitting RLC entity due either to (1) the product of the RLC PDU size and RLC transmission window being too small; or (2) uplink status reports from the receiving RLC entity being sent too infrequently. Because there is a practical limit to the maximum size of RLC PDUs and the maximum frequency with which status reports may be sent, increasing the RLC window size is an attractive way to achieve the required 336 Mbps data rate. However, this would require extending the RLC SN space from 12 bits to at least 14 bits. This is achieved by embodiments herein in an efficient manner.

Figure 1:
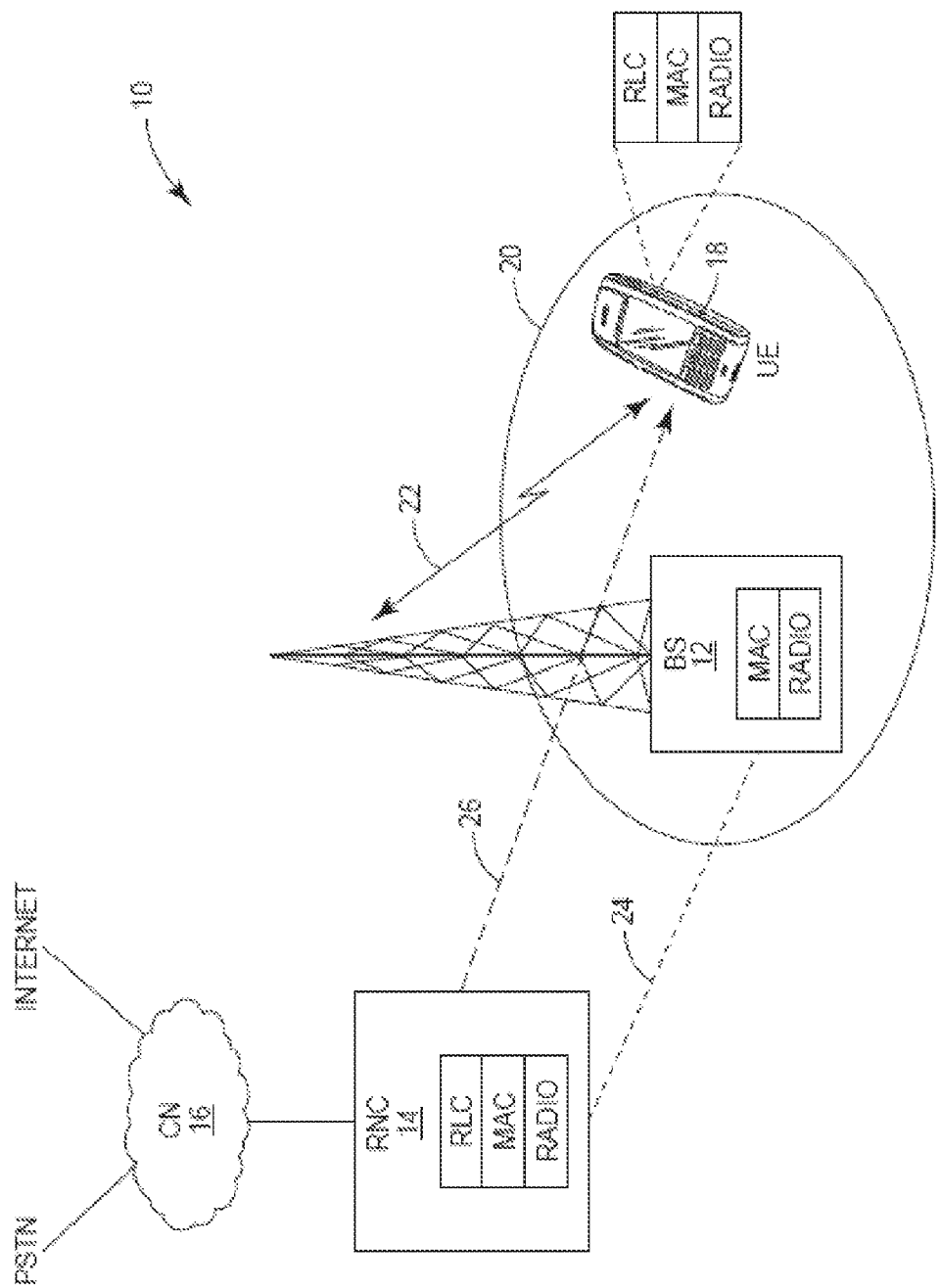
FIG. 1 is a schematic overview depicting embodiments herein in a wireless communication system.

FIG. 1 below depicts a simplified example of a wireless communication system 10 according to some embodiments herein. As shown, the system 10 includes a base station 12, a radio network controller (RNC) 14, and a core network (CN) 16. The base station 12 comprises radio equipment for communicating with one or more user equipment 18 in a serving cell 20, over radio resources 22. The RNC 14 is geographically separated from the base station 12 and communicates with the base station 12 over a backhaul link 24. Though separated from the base station 12, the RNC 14 actually manages or controls the base station's 12 radio resources 22. The CN 16 communicatively couples the RNC 14 to other systems, such as the as the Public Switched Telephone Network (PSTN), the Internet, and the like.

Responsible for different parts of radio access functionality, the base station 12 and RNC 14 terminate different protocol layers. The base station 12 terminates relatively lower layers including e.g. the Medium Access Control (MAC) layer, or at least a sub-layer thereof over radio, while the RNC 14 terminates relatively higher layers including the Radio Link Control (RLC) layer.

In this regard, the RNC 14 receives data packets, e.g. RLC Service Data Units, SDUs, from the CN 16 that are to be sent to the user equipment 18 in the downlink. The RNC 14 segments these RLC SDUs into packet data units such as RLC Protocol Data Units (PDUs). The RNC 14 sequentially numbers these RLC PDUs for uniquely identifying them, so that the RNC 14 may retransmit RLC PDUs that are not correctly received by the user equipment 18. By doing so, the RNC 14 assigns each RLC PDU a sequence number (SN). The RNC 14 includes the SN of each RLC PDU in a header of that PDU. The RNC 14 then sends the RLC PDUs to the user equipment 18, via the base station 12, over an RLC link 26, which is a link between the RNC 14 and the user equipment 18 at the RLC layer. Embodiments herein generally relate to radio link control (RLC) in wireless communication systems, and particularly some embodiments relate to expanding the Sequence Number (SN) space of RLC protocol data units (PDUs) for Acknowledged Mode (AM) operation.

Embodiments herein support the 336 Mbps data rate e.g. specified for 8C-HSDPA in Rel-11 or 4C-HSDPA with MIMO by providing an indication in a header in the packet data unit indicating whether the number of bits for the sequence number is increased and are also backwards compatibility for legacy user equipment. That is, introducing e.g. an RLC header format for indicating e.g. 14 bit RLC SNs and also enabling legacy UEs of receiving RLC PDUs, without requiring higher layer, e.g., Radio Resource Control (RRC) signaling to indicate which RLC header format is being used, e.g., the legacy format or a new format. Thus, embodiments herein extend the RLC SN space for supporting higher RLC data rates while retaining backwards compatibility for legacy user equipment. For instance, some embodiments use reserved bits in the legacy RLC AM header to indicate that the next portion of the header includes an extension to the RLC SN. These embodiments thereby introduce support for a larger SN space, which in turn allows for higher peak data rates over RLC while retaining compatibility with the legacy RLC AM header.

The wireless communication system 10 may be any cellular radio network comprising a RNC capable of establishing and routing a data packet session through different network transmission paths exploiting different routing protocols, the wireless communication system 10 may e.g. be a UTRAN-GPRS network, a WCDMA network, a CDMA 2000 network, an IS-95 network, a D-AMPS network etc. The term RNC should here therefore not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realised in the BSCs (Base Station Controllers) of the CDMA 2000 network. It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within respective cell. Furthermore, the base station 12 may also be referred to as e.g. a NodeB, an evolved Node B (eNB, eNode B), radio base station, a base transceiver station, Access Point Base Station, base station router, or any other network unit capable to communicate with the user equipment 18 within the cell served by the base station 12 depending e.g. of the radio access technology and terminology used. While the embodiments described herein concerns and exemplifies data sent on the downlink, the methods and devices are also applicable for high bit rate uplink data transmission.

Figure 2:
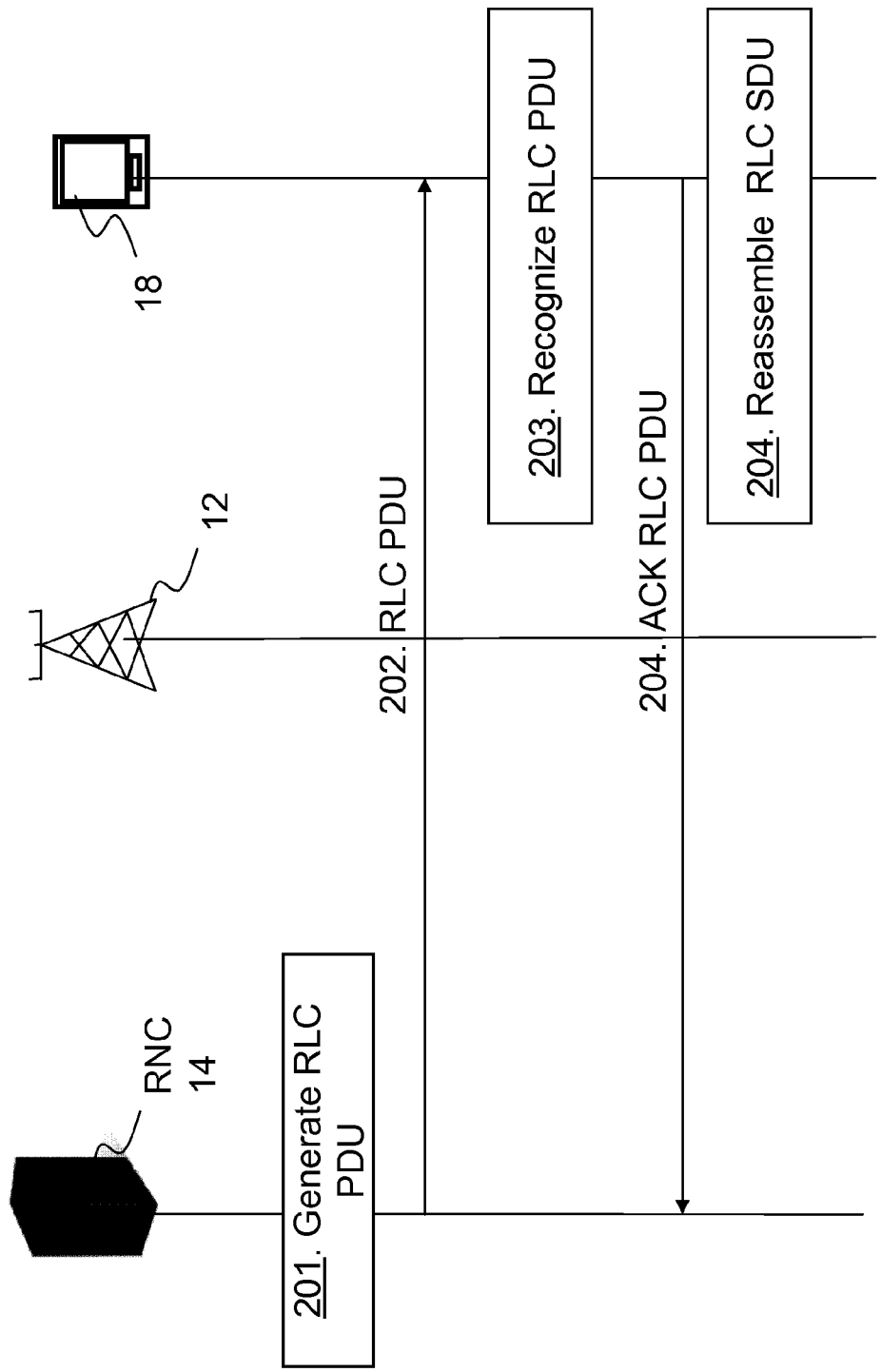
FIG. 2 is a schematic combined flowchart and signalling scheme in the wireless communications system.

FIG. 2 is a schematic combined flowchart and signaling scheme depicting embodiments of a method in the wireless communication system 10.

Action 201. The radio network controller 14 may generate one or more RLC PDUs for the user equipment 18 from a received RLC SDU intended for the user equipment 18. The radio network controller 14 adds a sequence number to every RLC PDU enabling the user equipment 18 to reassemble the RLC SDU after reception of all the RLC PDUs. In embodiments herein, the radio network controller 14 indicates in a second field in the header that the sequence number stretches over a number of fields and octets of bits, such as a first field and a third field. The radio network controller 14 indicates with e.g. a preconfigured value in a two bit field indicating that the third field of the header comprises bits for the sequence number as an extension of bits to the first field for the sequence number. The first field may stretch over two octets of bits of the header.

Action 202. The radio network controller 14 transmits the one or more RLC PDUs with the header to the user equipment 18.

Action 203. The user equipment 18, being e.g. a 4C-HSDPA or a 8C-HSDPA, receives the RLC PDU and recognizes from the second field that the sequence number of the RLC PDU stretches over the third field e.g. being comprised in a third octet of bits of the header. The user equipment 18 is thus configured to recognize the indication in the second field.

Action 204. The user equipment 18 transmits feedback to the RNC 14, e.g. an acknowledgement of received RLC PDU.

Action 205. The user equipment 18 reassembles all the received RLC PDUs into a RLC SDU based on the sequence numbers of received RLC PDUs.

Figure 3:
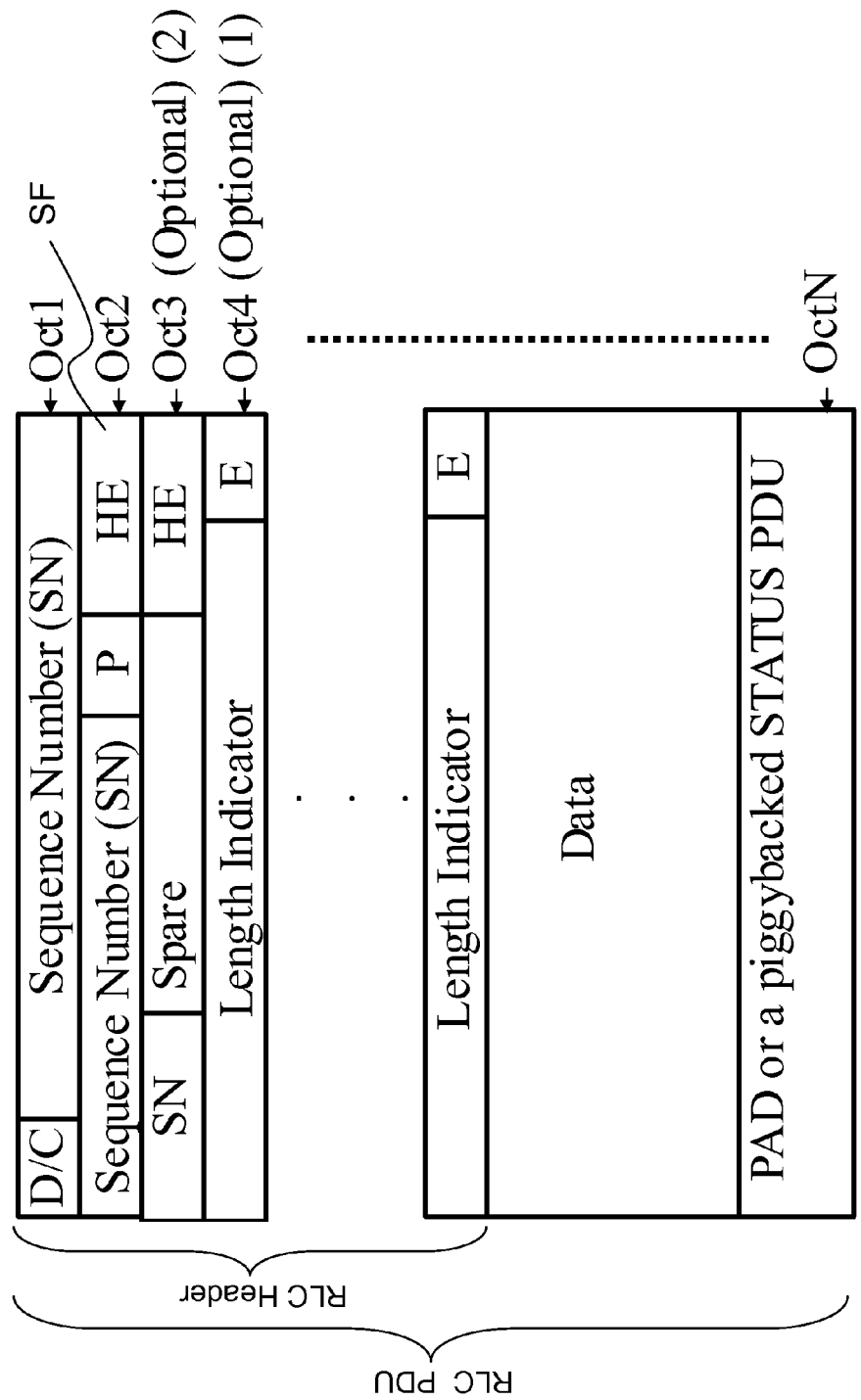
FIG. 3 is a block diagram illustrating a AMD PDU with a header according to embodiments herein.

FIG. 3 schematically shows a packet data unit with the RLC AM header for Wideband Code Division Multiple Access (WCDMA) wherein embodiments herein may be implemented. The packet data unit exemplified as an RLC PDU such as an Acknowledged Mode Data (AMD) PDU is used to transfer user data, Data, piggybacked status PDU, Padding, PAD, and/or a Polling bit when RLC is operating in acknowledged mode. The length in bits of the data part is a multiple of 8 bits, i.e. multiple of octets of bits. The AMD PDU header, or the RLC header, comprises first two octets, Oct 1 and Oct 2, and optionally three or four octets of bits, Oct 3 and Oct 4. The Oct 1 comprises a D/C field indicating whether the RLC PDU is a data or control PDU and the "Sequence Number (SN)" of the AMD PDU. In some embodiments at least one octet of bits comprises "Length Indicators" and at least one octet of bits comprises in some embodiments herein a Header Extension (HE) field. The second octet Oct 2 may further comprise a P-field indicating whether to poll the receiving RLC entity or not. According to embodiments herein the header comprises the Second Field (SF) exemplified herein as the HE field in the Oct 2. The second field SF may comprise the at least one bit indicating that the third field, illustrated as the SN field in the third octet Oct 3, comprises bits for extension of the sequence number. The third octet Oct 3 further comprises a spare field which may be used e.g. for additional bits for sequence number or similar. The fourth octet Oct 4 may further comprise length indicator indicating the length of the RLC PDU and an E bit indicating if the next octet of bits is another LI or data. The packet data unit may comprise 1-N octets of bits.

According to some embodiments herein a HE value "11", reserved in rel-10, is redefined to indicate the presence of an extended RLC header. NOTE (1): The "Length Indicator" may be 15 bits. NOTE (2): Presence of optional octet three is indicated by HE=11 in octet 2. Field Sequence Number (SN) indicates the "Sequence Number" of the RLC PDU, encoded in binary.

Table 1 discloses the number of bits, Length, for the SN for each PDU type, AMD PDU and Unacknowledged Mode Data (UMD) PDU and what the SN is used for under Notes

TABLE 1

Length of SN in bits for different PDUs

| PDU type | Length | Notes |
| --- | --- | --- |
| AMD PDU | 12 or 14 bits (1) | Used for retransmission and reassembly |
| UMD PDU | 7 bits | Used for reassembly |

NOTE (1):
The AMD PDU SN may be 12 or 14 bits depending on the header configuration as defined in section 9.2.1.4.

Header Extension Type (HE) field is defined in Table 2 below. The HE value "11" is redefined to indicate the presence of an extended RLC header, as follows:

Length in bits: 2 bits in the illustrated example but may be one or more bits. This two-bit field indicates if the next octet of bits is an extension of the header, data or a "Length Indicator" and E bit as shown in Table 2. The predefined value '11' may indicate that one or more bits of the next octet of bits is used for SN bits and not as rel-10 'Reserved (PDUs with this coding will be discarded by this version of the protocol)'.

TABLE 2

HE values and description of the values.

| Value | Description |
| --- | --- |
| 00 | The succeeding octet of bits comprises data |
| 01 | The succeeding octet of bits comprises a length indicator and E bit |
| 10 | If "Use special value of the HE field" is configured, the succeeding octet of bits comprises data and the last octet of bits of the PDU is the last octet of bits of an SDU. Otherwise, this coding is reserved (PDUs with this coding will be discarded by this version of the protocol). |
| 11 | The succeeding octet of bits comprises a header extension in which the first 2 bits are the last 2 bits of the 14 bit sequence number. The next 4 bits are spare. The last 2 bits is the header extension (HE) field. |

A person skilled in the art will realize that the number of bits used for the SN may, depending on the number of bits reserved as spare, be extended from the legacy 12 bits to any number between 13 and 18 bits with the method as outlined herein. The 14 bits SN chosen above was selected to align the header format to a currently proposed 14 bit SN. Embodiments herein thus advantageously introduce a new header format within the constraints set by the legacy RLC AMD header, by making use of a previously reserved bit value for the header extension (HE). In addition, the new header format may co-exist with the current RLC AM header. Moreover, transitions between the 8C-HSDPA or 4C-HSDPA and legacy RLC header format may be done without RLC reset, which would be necessary if a new incompatible RLC header format is defined for 8C-HSDPA or 4C-HSDPA. A further advantage is that there is no need for higher layer signaling such as Radio Resource Control (RRC) protocol signaling to determine which RLC AM header format to use since this may be achieved with the in-band HE=11 indication instead.

Figure 4:
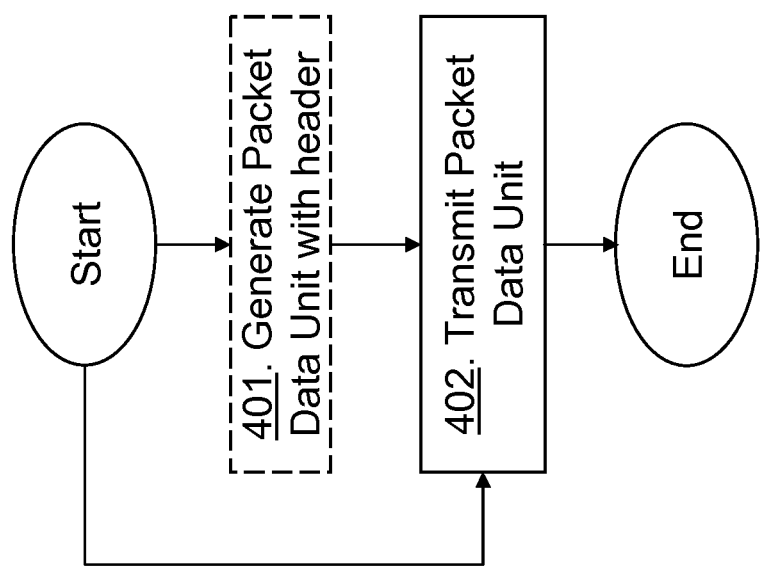
FIG. 4 is a schematic flowchart of a method in a radio network controller according to embodiments herein.

The method actions in the radio network controller 14 for transmitting data to the user equipment 18 in the wireless communication system 10 according to some general embodiments will now be described with reference to a flowchart depicted in FIG. 4. The steps do not have to be taken in the order stated below, but may be taken in any suitable order. The radio network controller 14 is communicating over a Radio Link Control layer with the user equipment 18. Optional actions only performed in some embodiments are marked with dashed boxes.

Action 401. The radio network controller 14 may generate the packet data unit which comprises to assign the sequence number to the packet data unit and to indicate in the second field that the sequence number is comprised in the first field and the third field. The radio network controller 14 may perform the generation only when the user equipment 18 is using a particular technology, e.g. 4C-HSDPA and MIMO, or 8C-HSDPA.

Action 402. The radio network controller 14 transmits the packet data unit to the user equipment 18. The packet data unit comprises a header with the first field. The first field comprises bits for a sequence number of the packet data unit. The header further comprises the second field comprising at least one bit indicating that the third field of the header comprises bits for the sequence number as an extension of bits to the first field for the sequence number. In some embodiments the third field comprises two to six bits followed by a header extension field indicating length of the packet data unit. The second field may comprise two bits with a preconfigured value, which preconfigured value indicates that the third field of the header comprises bits for the sequence number. The preconfigured value may define that a succeeding octet of bits of the header comprises first two bits that are the last two bits of a fourteen bit sequence number, next four bits that are spare bits, and last two bits that are header extension field bits. The packet data unit may be a Radio Link Control Protocol Data Unit and the header may be a Radio Link Control Acknowledgment Mode header. It should be understood that protocol enhancements described herein are also applicable for uplink applications.

Figure 5:
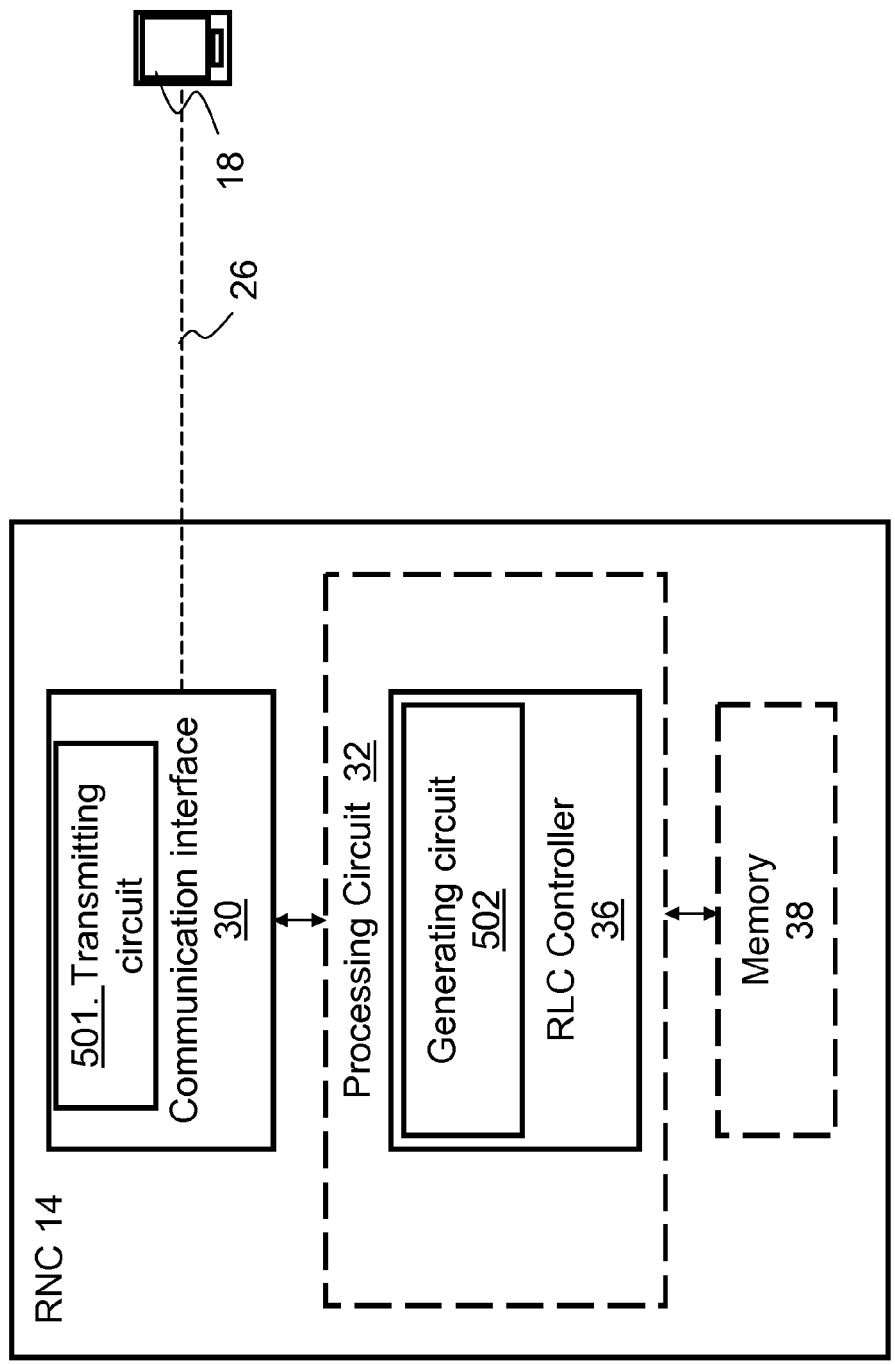
FIG. 5 is a block diagram depicting a radio network controller according to embodiments herein.

FIG. 5 is a block diagram depicting the radio network controller 14 for transmitting data to the user equipment 18 in the wireless communication system 10. The radio network controller 14 is configured to communicate over the Radio Link Control layer with the user equipment 18.

The radio network controller 14 comprises a transmitting circuit 501 configured to transmit a packet data unit to the user equipment 18. As stated above, the packet data unit comprises the header with the first field. The first field comprises bits for the sequence number of the packet data unit. The header further comprises the second field comprising at least one bit indicating that the third field of the header comprises bits for the sequence number as an extension of bits to the first field for the sequence number.

According to some embodiments the third field comprises two to six bits followed by a header extension field indicating length in bits of the packet data unit. The second field may comprise two bits with a preconfigured value, which preconfigured value indicates that the third field of the header comprises bits for the sequence number. The preconfigured value defines that a succeeding octet of bits of the header comprises first two bits that are the last two bits of a fourteen bit sequence number, next four bits that are spare bits, and last two bits that are header extension field bits. The packet data unit may be a Radio Link Control Protocol Data Unit and the header may be a Radio Link Control Acknowledgment Mode header.

According to some embodiments the radio network controller 14 may comprise a generating circuit 502 configured to generate the packet data unit and to assign the sequence number to the packet data unit. The generating circuit 502 may further be configured to indicate in the second field that the sequence number is comprised in the first field and the third field. The generating circuit 502 may be configured to generate the packet data unit only when the user equipment 18 is using a particular technology. The particular technology may be High Speed Data Packet Access for eight or four carriers.

FIG. 5 further illustrates the RNC 14 in greater detail, for elaborating on precisely how the RNC 14 includes the SN of each PDU in the header of that PDU. As shown, the RNC 14 may include a communication interface 30 comprising the transmitting circuit 501 and one or more processing circuits 32, including an RLC controller 36 comprising the generating circuit 502.

The communication interface 30 may be configured to communicate with the user equipment 18 over a RLC link 26 via the base station 12. The RLC controller 36 may further be configured to generate RLC PDUs from RLC SDUs by assigning each RLC PDU an SN and including that SN in the RLC PDU. In including the SN in the RLC PDU, the RLC controller 36, according to embodiments herein, distributes the SN over at least three consecutive portions of the RLC PDU, where each portion has a predetermined size, e.g. 1 octet of bits. Moreover, in each of one or more portions after the first portion, the RLC controller 36 includes an indicator that identifies the next consecutive portion as continuing the SN of the RLC PDU. The RLC controller 36 is then configured to send the generated RLC PDUs to the user equipment 18 via the communication interface 30.

In one or more embodiments, the above indicator comprises a predefined value for a particular field or bit in the associated portion of the RLC PDU. Other values for that field may indicate that the next consecutive portion comprises other information, such as actual data rather than part of a SN.

In this regard, the RLC controller 36 may be configured to selectively set the particular field to different values for different UEs. As one example, the RLC controller 36 may set the particular field to one value, the value indicating that the next consecutive RLC PDU portion continues the SN, for a user equipment using a particular radio access technology, e.g., 8C-HSDPA, and set the particular field to a different value (a value indicating that the next consecutive RLC PDU portion contains actual data) for a user equipment using another technology, e.g., a legacy technology such as DC-HSDPA. The former technology may benefit from a relatively larger SN, one that needs to be distributed over three or more RLC PDU portions, while the latter technology may not, and therefore the SN need not be so distributed. Nonetheless, even though the different UEs use different radio access technologies, both UEs are configured to recognize or otherwise interpret the particular field; that is, the RLC PDU generation is backwards compatible with legacy technologies. The embodiments thereby extend the RLC SN space as compared to legacy RLC PDU generation in order to support higher RLC data rates, while retaining backwards compatibility for legacy technologies.

Those skilled in the art will of course appreciate that the various "circuits" described may refer to a combination of analog and digital circuits, and/or one or more processors configured with software stored in a memory 38 and/or firmware stored in the memory 38 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
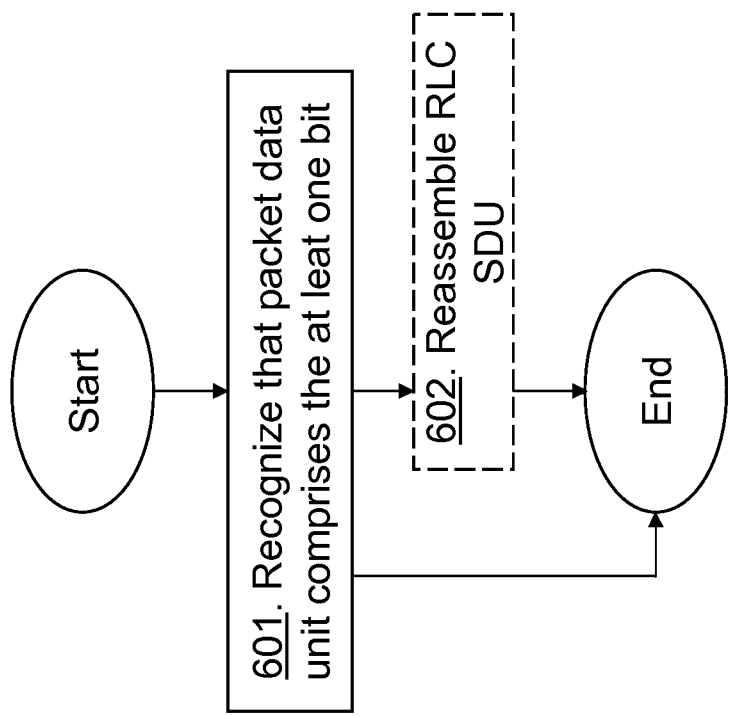
FIG. 6 is a schematic flowchart of a method in a user equipment according to embodiments herein.

The method actions in the user equipment 18 for receiving data from the radio network controller 14 in the wireless communication system 10 according to some general embodiments will now be described with reference to a flowchart depicted in FIG. 6. The actions do not have to be taken in the order stated below, but may be taken in any suitable order. Optional actions only performed in some embodiments are marked as dashed boxes. The user equipment 18 is communicating over the Radio Link Control layer with the radio network controller.

Action 601. The user equipment 18 recognizes that a packet data unit received from the radio network controller 14 comprises a header with bits indicating a sequence number in the first field and in the third field based on at least one bit in the second field of the header. The at least one bit indicates that the third field of the header comprises bits for the sequence number as an extension of bits to the first field for the sequence number.

The third field may comprise two to six bits followed by a header extension field indicating length of the packet data unit. The second field may in some embodiments comprise two bits with a preconfigured value. The preconfigured value indicates that the third field of the header comprises bits for the sequence number, e.g. the value 11 in a legacy HE field. The preconfigured value may define that a succeeding octet of bits of the header comprises first two bits that are the last two bits of a fourteen bit sequence number, next four bits that are spare bits, and last two bits that are header extension field bits. The packet data unit may be a Radio Link Control Protocol Data Unit and the header may be a Radio Link Control Acknowledgment Mode header. The user equipment 18 may use High Speed Data Packet Access for eight or four carriers.

Action 602. The user equipment 18 may then reassemble a RLC SDU from e.g. a number of received RLC PDUs based on the sequence number.

Figure 7:
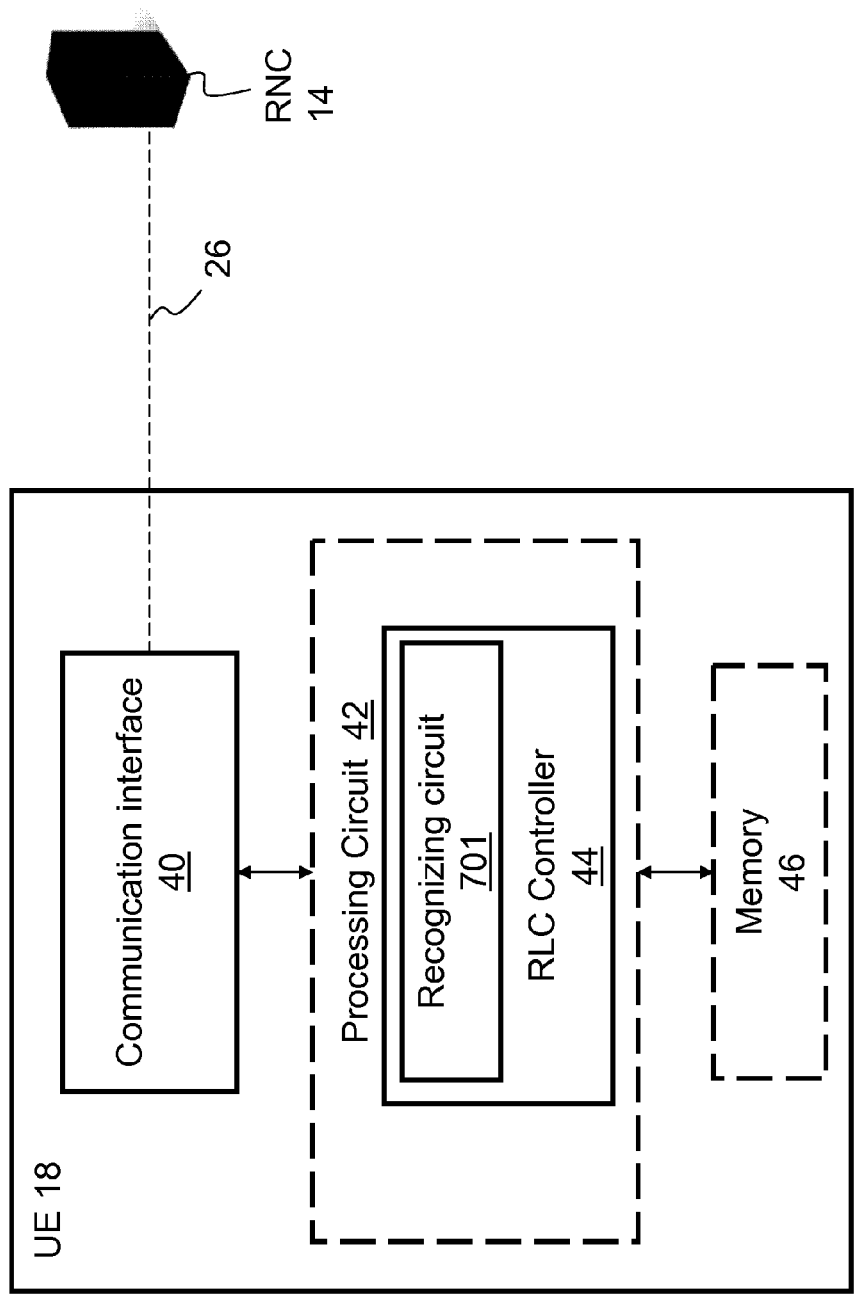
FIG. 7 is a block diagram depicting a user equipment according to embodiments herein.

FIG. 7 is a block diagram depicting the user equipment 18 for receiving data from the radio network controller 14 in the wireless communication system 10. The user equipment 18 is configured to communicate over the Radio Link Control layer with the radio network controller 14. The user equipment 18 comprises a recognizing circuit 701 configured to recognize that the packet data unit received from the radio network controller 14 comprises the header with bits indicating the sequence number in the first field and in the third field based on the at least one bit in the second field of the header. The at least one bit indicates that the third field of the header comprises bits for the sequence number as an extension of bits to the first field for the sequence number.

As stated above the third field may comprise two to six bits followed by a header extension field indicating length in bits of the packet data unit. The second field may comprise two bits with a preconfigured value. The preconfigured value indicates that the third field of the header comprises bits for the sequence number. The preconfigured value may define that the succeeding octet of bits of the header comprises: first two bits that are the last two bits of a fourteen bit sequence number; next four bits that are spare bits; and last two bits that are header extension field bits. The packet data unit may be a Radio Link Control Protocol Data Unit and the header may be a Radio Link Control Acknowledgment Mode header. In some embodiments the user equipment 18 may be configured to use High Speed Data Packet Access for eight or four carriers.

FIG. 7 illustrates additional details of the user equipment 18 according to one or more embodiments. As shown, the user equipment 18 may include a communication interface 40 and one or more processing circuits 42, including an RLC controller 44, which RLC controller 44 comprises the recognizing circuit 701.

The communication interface 40 may be configured to communicate with the RNC 14 over the RLC link 26 via the base station 12. The RLC controller 44 is configured to receive RLC PDUs from the RNC 14 and to inspect each RLC PDU for a SN. In inspecting each RLC PDU, the RLC controller 44 is configured to recognize one of a plurality of consecutive portions of the RLC PDU as including part of the SN, and to interpret or otherwise recognize an indicator in that portion as identifying that the next consecutive portion continues the SN (e.g., contains the rest of the SN).

In one or more embodiments, the above indicator comprises a predefined value for the particular field or bit in the associated portion of the RLC PDU. Other values for that field may indicate that the next consecutive portion comprises other information, such as actual data rather than part of a SN. Thus, the above provide revisions to the RLC header format defined in 25.322 version 10.0.0 section 9.2.1.4.

Those skilled in the art will of course appreciate that the various "circuits" described may refer to a combination of analog and digital circuits, and/or one or more processors configured with software stored in a memory 46 and/or firmware stored in memory 46 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
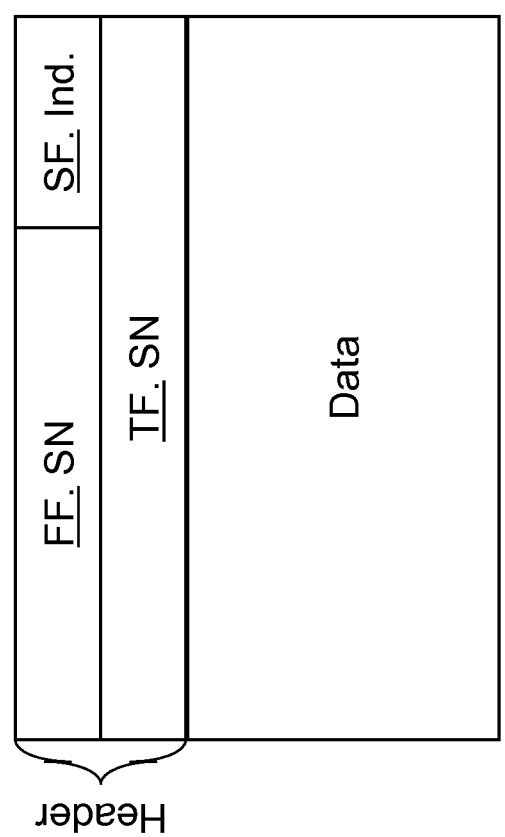
FIG. 8 is a block diagram depicting a packet data unit according to embodiments herein.

FIG. 8 is a block diagram depicting the data packet unit for transmitting data between the radio network controller 14 and the user equipment 18 according to embodiments herein. The data packet unit comprises a header with a First Field (FF), which first field comprises bits for a sequence number of the packet data unit. The header further comprises a second field (SF) comprising at least one bit indicating that a Third Field (TF) of the header comprises bits for the sequence number as an extension of bits to the first field for the sequence number. As stated above, the third field may comprise two to six bits followed by a header extension field indicating length in bits of the packet data unit. The second field may further comprise two bits with a preconfigured value, which preconfigured value, such as '11', indicates that the third field of the header comprises bits for the sequence number. The preconfigured value may define that a succeeding octet of bits of the header comprises first two bits that are the last two bits of a fourteen bit sequence number, next four bits that are spare bits, and last two bits that are header extension field bits as illustrated in FIG. 3. The packet data unit may be a Radio Link Control Protocol Data Unit and the header may be a Radio Link Control Acknowledgment Mode header. It should be understood that protocol enhancements described herein are also applicable for uplink applications. Thus, the user equipment 18 may transmit the packet data unit described above to the radio network controller 14 indicating sequence number of the packet data unit.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

The invention claimed is:

1. A method in a radio network controller for transmitting data to a user equipment in a wireless communication system, which radio network controller is communicating over a Radio Link Control layer with the user equipment, said method comprising:
   assigning an extended sequence number to a packet data unit to be transmitted to the user equipment, said extended sequence number having an extended number space and comprising a first number of bits representing a sequence number in a smaller number space, and further comprising a second number of bits representing a sequence number extension that extends the sequence number into the extended number space;
   generating the packet data unit comprising a header with a first field of bits conveying the sequence number of the packet data unit, a third field of bits comprising the sequence number extension, and a second field of one or more bits indicating that a third field of the header comprises the sequence number extension; and
   transmitting the packet data unit to the user equipment.

2. The method of claim 1, wherein the third field comprises two to six bits followed by a header extension field indicating a length in bits of the packet data unit.

3. The method of claim 1, wherein the second field comprises two bits and the method includes setting the two bits to a preconfigured value, which preconfigured value indicates that the third field of the header comprises bits that extend the sequence number.

4. The method of claim 3, wherein the preconfigured value defines that a succeeding octet of bits of the header comprises a first two bits that are the last two bits of a fourteen bit sequence number as said extended sequence number, a next four bits that are spare bits, and a last two bits that are header extension field bits.

5. The method of claim 1, wherein the packet data unit is a Radio Link Control Protocol Data Unit and the header is a Radio Link Control Acknowledgment Mode header.

6. The method of claim 1, wherein the generating is performed only when the user equipment is using a particular technology.

7. The method of claim 6, wherein the particular technology is High Speed Data Packet Access for eight or four carriers.

8. A method in a user equipment for receiving data from a radio network controller in a wireless communication system, which user equipment is communicating over a Radio Link Control layer with the radio network controller, said method comprising:
   receiving a packet data unit from the radio network controller comprising a header with bits indicating a sequence number in a first field;
   recognizing from bits in a second field of the header that a third field of the header includes bits representing a sequence number extension, for forming an extended sequence number from the sequence number of the first field, said extended sequence number having an extended number space as compared to a number space of the sequence number; and determining the extended sequence number of the received packet data unit based on the sequence number and the sequence number extension.

9. The method of claim 8, further comprising determining a length of the packet data unit in bits, from a header extension field that indicates the length in bits of the packet data unit and follows the third field.

10. The method of claim 8, wherein the method includes recognizing that the second field comprises two bits with a preconfigured value, which preconfigured value indicates that the third field of the header comprises the sequence number extension.

11. The method of claim 10, wherein the preconfigured value defines that a succeeding octet of bits of the header comprises first two bits that are the last two bits of a fourteen bit sequence number, next four bits that are spare bits, and last two bits that are header extension field bits.

12. The method of claim 8, wherein the packet data unit is a Radio Link Control Protocol Data Unit and the header is a Radio Link Control Acknowledgment Mode header.

13. The method of claim 8, wherein the user equipment is using High Speed Data Packet Access for eight or four carriers.

14. A radio network controller for transmitting data to a user equipment in a wireless communication system, wherein the radio network controller is configured to communicate over a Radio Link Control layer with the user equipment and comprises:

a processor configured to:
assign an extended sequence number to a packet data unit to be transmitted to the user equipment, said extended sequence number having an extended number space and comprising a first number of bits representing a sequence number in a smaller number space, and further comprising a second number of bits representing a sequence number extension that extends the sequence number into the extended number space; and generate the packet data unit comprising a header with a first field of bits conveying the sequence number of the packet data unit, a third field of bits comprising the sequence number extension, and a second field of one or more bits indicating that a third field of the header comprises the sequence number extension; and a transmitting circuit configured to transmit the packet data unit to the user equipment.

15. The radio network controller of claim 14, wherein the third field comprises two to six bits followed by a header extension field indicating a length in bits of the packet data unit.

16. The radio network controller of claim 14, wherein the second field comprises two bits and wherein the processor is configured to set the two bits to a preconfigured value, which preconfigured value indicates that the third field of the header comprises bits that extend the sequence number.

17. The radio network controller of claim 16, wherein the preconfigured value defines that a succeeding octet of bits of the header comprises a first two bits that are the last two bits of a fourteen bit sequence number as said extended sequence number, a next four bits that are spare bits, and a last two bits that are header extension field bits.

18. The radio network controller of claim 14, wherein the packet data unit is a Radio Link Control Protocol Data Unit and the header is a Radio Link Control Acknowledgment Mode header.

19. The radio network controller of claim 14, wherein the generating circuit is configured to generate the packet data unit only when the user equipment is using a particular technology.

20. The radio network controller of claim 19, wherein the particular technology is High Speed Data Packet Access for eight or four carriers.

21. A user equipment for receiving data from a radio network controller in a wireless communication system, wherein the user equipment is configured to communicate over a Radio Link Control layer with the radio network controller and comprises:

a receiver circuit configured to receive a packet data unit received from the radio network controller comprising a header with bits indicating a sequence number in a first field; and a processor configured to:
recognize from bits in a second field of the header that a third field of the header includes bits representing a sequence number extension, for forming an extended sequence number from the sequence number of the first field, said extended sequence number having an extended number space as compared to a number space of the sequence number; and determine the extended sequence number based on the sequence number and the sequence number extension.

22. The user equipment of claim 21, wherein the processor is configured to determine a length of the packet data unit in bits, from a header extension field indicating the length in bits of the packet data unit.

23. The user equipment of claim 21, wherein the processor is configured to recognize that the second field comprises two bits with a preconfigured value, which preconfigured value indicates that the third field of the header comprises bits for the sequence number.

24. The user equipment of claim 23, wherein the preconfigured value defines that a succeeding octet of bits of the header comprises a first two bits that are the last two bits of a fourteen bit sequence number, a next four bits that are spare bits, and a last two bits that are header extension field bits.

25. The user equipment of claim 21, wherein the packet data unit is a Radio Link Control Protocol Data Unit and the header is a Radio Link Control Acknowledgment Mode header.

26. The user equipment of claim 21, wherein the user equipment is configured to use High Speed Data Packet Access for eight or four carriers.

* * * * *